United States Patent [19]
Udagawa

[11] Patent Number: 5,825,480
[45] Date of Patent: Oct. 20, 1998

[54] OBSERVING APPARATUS

[75] Inventor: Tetsuo Udagawa, Omiya, Japan

[73] Assignee: Fuji Photo Optical Co., Ltd., Omiya, Japan

[21] Appl. No.: 763,782

[22] Filed: Dec. 11, 1996

[30] Foreign Application Priority Data

Jan. 30, 1996 [JP] Japan ..................................... 8-037179

[51] Int. Cl.$^6$ .................................................. G01B 11/26
[52] U.S. Cl. ........................................................ 356/138
[58] Field of Search ........................... 356/141.1, 141.2, 356/141.5, 139.01, 138

[56] References Cited

U.S. PATENT DOCUMENTS

| 4,601,053 | 7/1986 | Grumet ...................................... 356/12 |
| 4,949,089 | 8/1990 | Ruszkowski, Jr. ........................ 342/52 |
| 5,026,158 | 6/1991 | Golubie .................................... 356/252 |
| 5,262,838 | 11/1993 | Tocher ...................................... 356/16 |
| 5,623,335 | 4/1997 | Bamberger ............................ 356/141.1 |
| 5,644,386 | 7/1997 | Jenkins et al. .......................... 356/4.01 |

OTHER PUBLICATIONS

Magellan Chartmate, advertisement, 1995, Japan.
Federal Radionavigation Plan, specifications, 1994, Japan.

Primary Examiner—Frank G. Font
Assistant Examiner—Zandra V. Smith
Attorney, Agent, or Firm—Ronald R. Snider

[57] ABSTRACT

In an observing apparatus such as a binocular or monocular for viewing an object to be observed, a target position for observation is computed on the basis of own position information, azimuth information, and distance information to the observation target; and thus computed result is displayed within a visual field, whereby the target position for observation is determined correctly and rapidly. Based on an electric wave signal from a GPS satellite (50), the own current position is detected (S1). From an azimuth detection sensor (27) and a depression and elevation angle detection sensor (29), azimuth data and depression and elevation angle data from the own current position to the sufferer direction is detected (S2). From a topographic map memory (25), topographic map information near the own position is read out (S4). This map information includes data of absolute coordinates for each position of the topographic map. Based on these kinds of data and the topographic map information, a CPU (31) retrieves the coordinates of the position which initially crosses the surface of the earth in the direction of the position of the object to be observed (S5) and displays the information concerning this target position for observation within a visual field.

7 Claims, 6 Drawing Sheets

F I G. 2
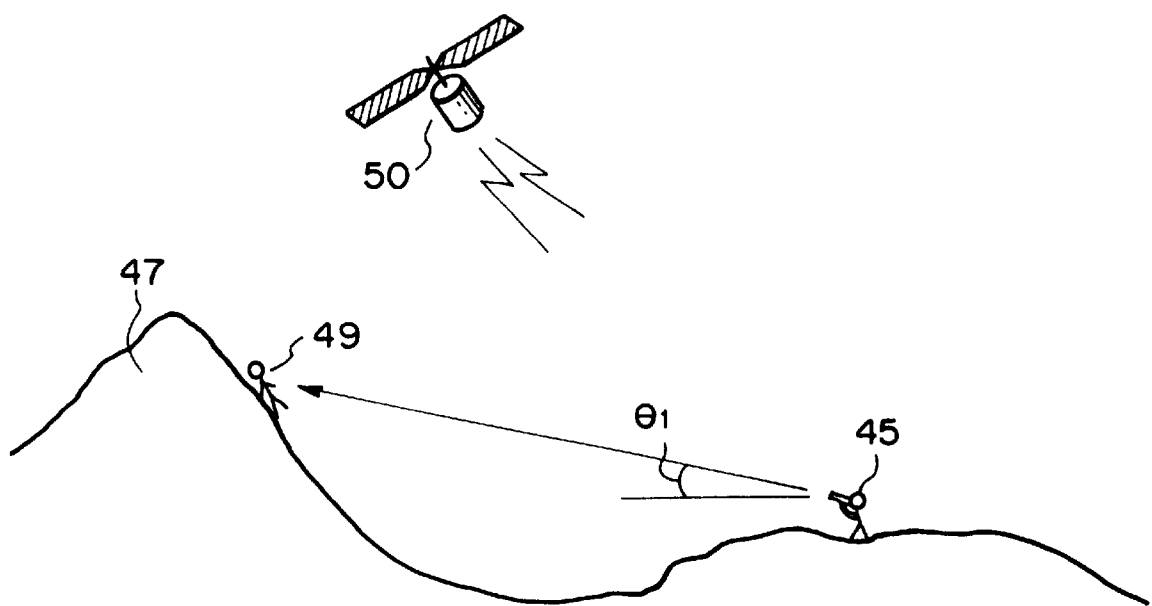

OBSERVING APPARATUS

RELATED APPLICATIONS

This application claims the priority of Japanese Patent Application No. 8-37179 filed on Jan. 30, 1996, which is incorporated herein by reference.

BACKGROUND OF THE INVENTION

1. Field of the Invention

The present invention relates to an observing apparatus in which a binocular or monocular (referred to as "binocular or the like" hereinafter) or a camera for viewing an object to be observed is provided with a special function.

2. Description of the Prior Art

For example, when a injured person is to be rescued from a mountain or the sea, there is a case where it is necessary to specify the sufferer's current position from a distance. In such a case, a topographic map (nautical chart) of the neighborhood is opened to specify the rescuer's own position, the injured person is observed with a binocular or the like, the direction of this observation is specified by means of a magnet or the like, and then, based on such information, the sufferer's current position is heuristically specified on the topographic map.

It is, however, quite difficult to specify the correct position of the injured person according to such a technique. Also, it takes a lot of time even when the position is to be roughly specified.

Since the injured person should be rescued as soon as possible, the time for specifying the position should be as short as possible. Also, the injured person can be rescued faster when the position thereof is specified more correctly.

SUMMARY OF THE INVENTION

In view of such circumstances, the object of the present invention is to provide an observing apparatus which can instantly and correctly specify the current position of an object to be observed.

The first observing apparatus in accordance with the present invention is an observing apparatus which can display an image of an object to be observed in a desired direction and comprises:

- a self-position detecting means for detecting a position coordinate thereof;
- an azimuth detecting means for detecting a direction of observation by a user;
- a distance measuring means for measuring a distance thereof from the object to be observed;
- a position coordinate computing means which computes a position coordinate of the object to be observed, based on outputs of the self-position detecting means, azimuth detecting means, and distance measuring means; and
- a display means for displaying information concerning thus computed position coordinate.

The second observing apparatus in accordance with the present invention is an observing apparatus which can display an image of an object to be observed in a desired direction and comprises:

- a self-position detecting means for detecting a position coordinate thereof;
- an azimuth detecting means for detecting a direction of observation by a user;
- a distance measuring means for measuring a distance thereof from the object to be observed;
- a position coordinate computing means which computes a position coordinate of the object to be observed, based on outputs of the self-position detecting means, azimuth detecting means, and distance measuring means;
- a memory which stores digital map information;
- a map information readout means for reading out the map information within said memory; and
- a display means which displays the map information read out by the map information readout means, while displaying a predetermined mark at a position corresponding to the computed position coordinate in the displayed map information.

Preferably, the information concerning the position coordinate or a combination of the map information and predetermined mark is displayed within a visual field for observing the image of the object to be observed.

The distance measuring means may be constituted by a means for detecting an altitude difference thereof from the object to be observed and a means for detecting angle of depression and elevation in the direction of observation.

The observing apparatus of the present invention may be of a binocular type or a monocular type. The above-mentioned display means may display the information concerning the position coordinate or map information in one of the glass visual fields of the binocular, may selectively display an image of the object to be observed and the information concerning the position coordinate or map information within the glass visual field of the binocular or monocular, or may display the image of the object to be observed and the information concerning the position coordinate or map information within the glass visual field of the binocular or monocular in an overlapping manner.

BRIEF DESCRIPTION OF THE DRAWINGS

FIG. 2 is a view for explaining an operation of the glass unit shown in FIG. 1;

DESCRIPTION OF THE PREFERRED EMBODIMENTS

In the following, embodiments of the present invention will be explained.

Figure 1:
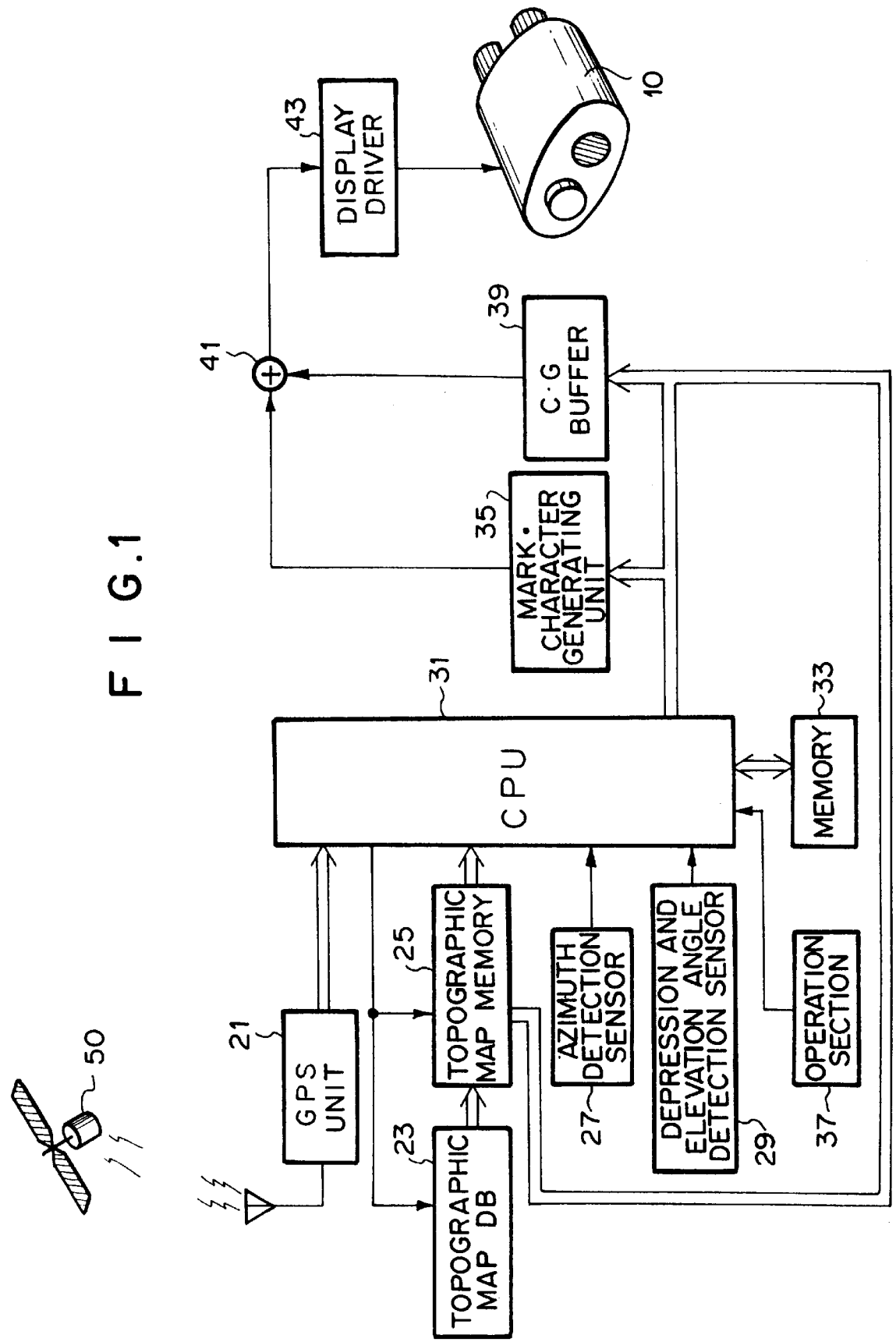
FIG. 1 is a block diagram showing a configuration of a glass unit in accordance with an embodiment of the present invention.

FIG. 1 is a block diagram showing a configuration of an observing apparatus in accordance with an embodiment of the present invention.

This observing apparatus is formed as a glass unit having an outer shape of a binocular type in which an enlarged landscape can be observed with the right eye while a topographic map near one's own position can be viewed with the left eye. Though means indicated by individual blocks in FIG. 1 are installed within a housing 10 of the observing apparatus (referred to as "glass unit" hereinafter) such that the topographic map image and a mark indicative of an observation target are displayed within the visual field of the left eye, they are depicted outside of the housing 10 in order to facilitate explanation.

As shown in FIG. 1, this glass unit comprises a GPS unit 21 which receives an electric wave signal from a GPS satellite 50; a topographic map database 23 stored in a CD-ROM, an IC card, or the like; a topographic map memory 25; an azimuth detection sensor 27 for detecting the azimuth of observing direction of the glass unit; a depression and elevation angle detection sensor 29 for detecting the angle of depression and elevation in the observing direction of the glass unit; a CPU 31 with an I/O function, which receives information from these means, subjects this information to a predetermined operation, and then outputs thus operated information; and a memory section 33 constituted by a ROM memory storing an operation program for the CPU 31 and a RAM memory storing various kinds of data. Also, connected to the CPU 31 is an operation section 37 by which an observer selects whether the information concerning the own current position and target position for observation should be superimposed onto the map image or not.

The glass unit further comprises a mark character generating unit 35 which generates a predetermined position mark or the like on the basis of the topographic map information, one's own position information, and target position information output from the CPU 31; a CG buffer 39 which temporarily stores selected image data from the CPU 31; a superimposing means 41 which superimposes the predetermined position mark or the like onto a predetermined position in the map image; and an LCD display driver 43 which drives a color LCD (color liquid crystal display panel which is not depicted in FIG. 1) on the basis of the map image signal.

The GPS unit 21 receives electric wave signals from a plurality of GPS satellites 50, computes its own current position (absolute coordinates of latitude, longitude, and altitude) from thus received signals, and then transmits its own position information obtained by this computation to the CPU 31.

Based on the own position information from the CPU 31, the topographic map database 23 transmits, to the topographic map memory 25, a map image data corresponding to the current position.

The azimuth detection sensor 27 is, for example, a sensor such as an electronic compass which detects azimuth. It can easily detect the azimuth of the optical system of the glass unit in the direction of the optical axis.

The depression and elevation angle detection sensor 29 can easily detect the angle of depression and elevation of the optical system of the glass unit in the direction of the optical axis.

In response to an instruction from the CPU 31, the mark character generating unit 35 generates a video signal for displaying a predetermined mark at a position on the map image corresponding to the own current position or target position for observation, while generating a video signal for displaying respective value (character) data for the latitude, longitude, and altitude indicative of the target position for observation.

In the following, the operation of this glass unit will be explained.

First, the GPS unit 21 receives three or four waves of GPS electric waves from the GPS satellites 50; computes the latitude, longitude, and altitude of the own current position from thus received information; and then transmits thus computed own position data to the CPU 31 per a predetermined time (e.g., per second).

Based on thus input own position data, the CPU 31 retrieves, of a number of sectional topographic maps stored in the topographic map database 23, a sectional topographic map including the position corresponding to the own position and then, capturing thus retrieved information data by way of the topographic map memory 25, transmits the map image data to the CG buffer 39.

Input to the CPU 31 are the azimuth data in the direction currently being observed by the glass unit and the depression and elevation angle data which are respectively transmitted from the azimuth detection sensor 27 and the depression and elevation angle detection sensor 29.

The CPU 31 subjects thus input own position data, information data concerning the topographic map, azimuth data, and depression and elevation angle to predetermined operations so as to compute the position coordinate of the observation target.

Thereafter, the map data transmitted to the CG buffer 39 is transmitted to the display driver 43 as a map image signal.

Figure 4:
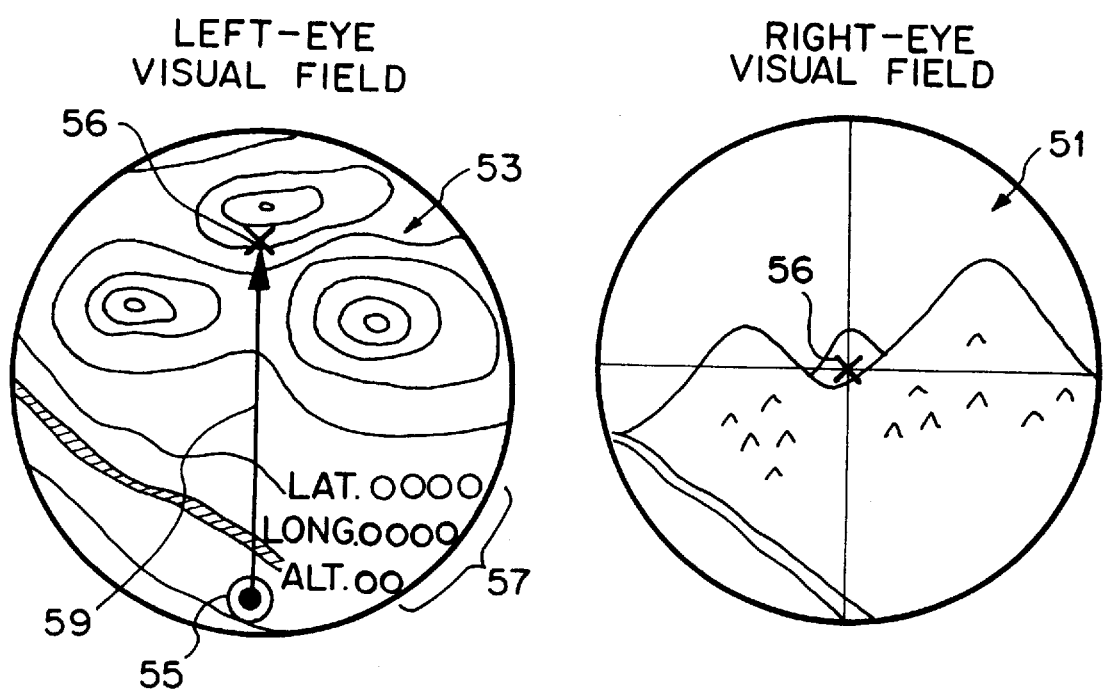
FIG. 4 is a view showing a landscape and a map image which are observed within visual fields of the glass unit shown in FIG. 1.

Based on thus input map image signal, the display driver 43 drives a color LCD (color liquid crystal display panel) 75 (see FIG. 5) disposed at a predetermined position within the housing 10 so as to display a color map image 53 on the LCD 75, whereby, as shown in FIG. 4, the map image corresponding to a landscape 51 seen within the right-eye visual field can be observed within the left-eye visual field.

When the observer manipulates the operation section 37 so as to effect an operation for displaying the own current position and target position for observation by means of marks and characters, the CPU 31 transmits an azimuth data to the mark character generating unit 35, while instructing the latter to generate image signals for displaying each of predetermined marks indicative of the own current position and target position for observation, latitude, longitude, and altitude values (characters) indicative of the target position for observation, and an arrow indicative of a direction from the own current position to the observation target.

The image signal generated by the mark character generating unit 35 is combined with the map image signal from the CG buffer 39 at the superimposing means 41, whereby the mark, values (characters), and arrow are superimposed onto the map image displayed within the left-eye visual field.

Here, as mentioned above, the present invention is characterized in that the coordinate of the observation target can be correctly recognized in a short time. In the following, the procedure for determining the position coordinate of the observation target in the above-mentioned embodiment will be explained with reference to FIGS. 2 and 3.

First, a case where an observer 45 determines the position of a sufferer 49 in a mountain 47 by means of the above-mentioned glass unit will be explained. As mentioned above, the glass unit held by hands of the observer 45 receives electric wave signals from the GPS satellites 50 and, based on thus received signals, detects the own current position (absolute coordinates of latitude, longitude, and altitude; S1 in FIG. 3).

Figure 3:
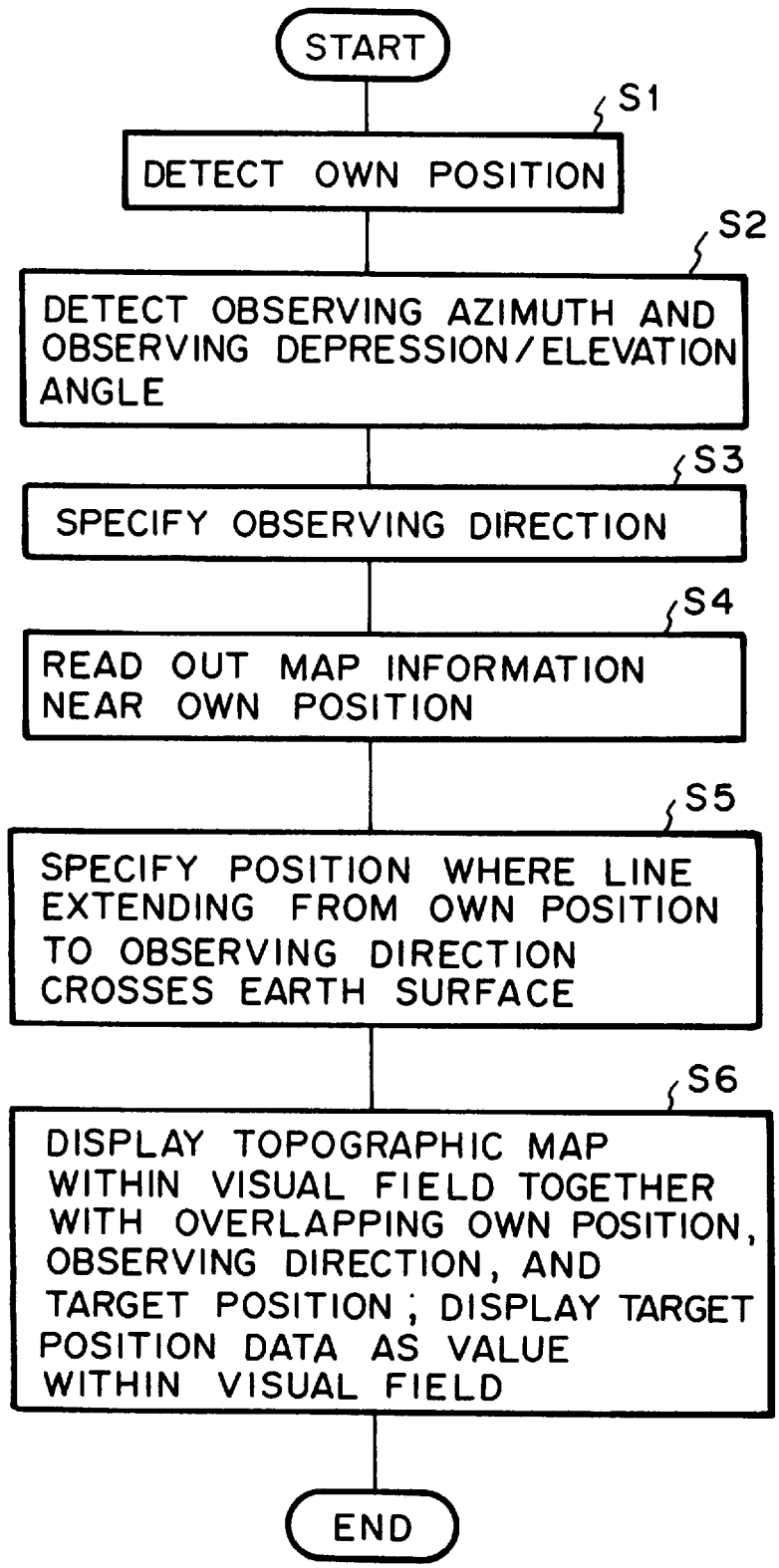
FIG. 3 is a flow chart for explaining the operation of the glass unit shown in FIG. 1.

Next, while the observer views an enlarged image of the sufferer 49 through the glass unit, the azimuth detection sensor 27 and the depression and elevation angle detection sensor 29 respectively transmit data concerning the azimuth of the sufferer direction (based on the north direction, for example) and depression and elevation angle (corresponding to θ 1 in FIG. 2) being observed from the own current position to the CPU 31 (S2 in FIG. 3).

From these data, the direction to which the glass unit is directed, i.e, the direction of the sufferer 49, is specified; and these data are stored in the memory section 33 (S3 in FIG. 3).

Subsequently, the CPU 31 reads out topographic map information near the own position from the topographic map memory 25 (S4 in FIG. 3). This topographic map information includes data concerning absolute values of longitude, latitude, and altitude for each position in the topographic map.

The CPU 31 reads out data concerning the direction stored in the memory section 33 and, from these data and the topographic map information, retrieves a coordinate of a position which initially crosses the surface of the earth in this direction (S5 in FIG. 3). Namely, it computes the position at which a line extending from the own position to the observing direction initially crosses the surface of the earth.

The coordinate of thus computed position represents the observation target, i.e., position of the sufferer.

Thereafter, as mentioned above, the map image 53 is displayed within the left-eye visual field, and the own position, observing direction, and target position are displayed so as to overlap the map image 53. Further, values (characters) indicative of the target position for observation are displayed within the left-eye visual field (S6 in FIG. 3).

Namely, as shown in FIG. 4, imposed onto the map image 53 observed within the left-eye visual field are a mark 55 indicative of the position corresponding to the own position; a mark 56 indicative of the position corresponding to the target position for observation; values 57 indicative of the latitude, longitude, and altitude of the own position; and an arrow 59 indicative of the direction from the own position to the target position for observation.

Accordingly, the observer can correctly recognize the target position for observation on the map image, thereby allowing an instruction to be rapidly sent to a rescue corps, for example. Also, the position can be specified more correctly as compared with the conventional method in which a topographic map is opened to specify the target position for observation while investigating the azimuth by means of a magnet.

Figure 5:
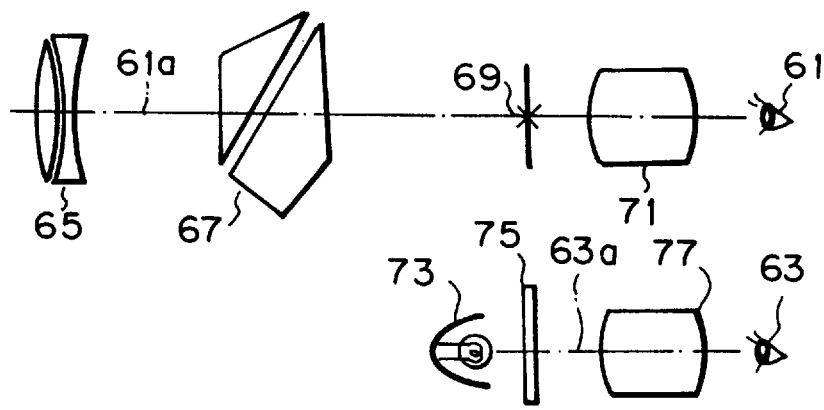
FIG. 5 is a schematic view showing an optical system of the glass unit shown in FIG. 1.

Here, within the housing 10, optical systems for the right and left eyes are configured as shown in FIG. 5.

Namely, the optical system for the right eye comprises an objective lens 65, an erect prism 67, and an ocular 71 which are disposed on a common optical axis 61a, such that an image of the observed landscape 51 formed at an imaging position 69 by the objective lens 65 and the erect prism 67 is enlarged by the ocular 71 and made incident on a right eye 61 of the observer. On the other hand, the optical system for the left eye comprises a back light 73, the LCD 75, and an ocular 77 which are disposed on a common optical axis 63a, such that the map image 53 on the LCD 75 illuminated with the back light 73 is enlarged by the ocular 77 and made incident on a left eye 63 of the observer. Here, the map image 53 displayed on the LCD 75 is generated as mentioned above.

Accordingly, as mentioned above, the observed landscape 51 is displayed within the right-eye visual field of the observer, while the map image 53 corresponding the observed landscape 51 is displayed within the left-eye visual field.

Figure 6:
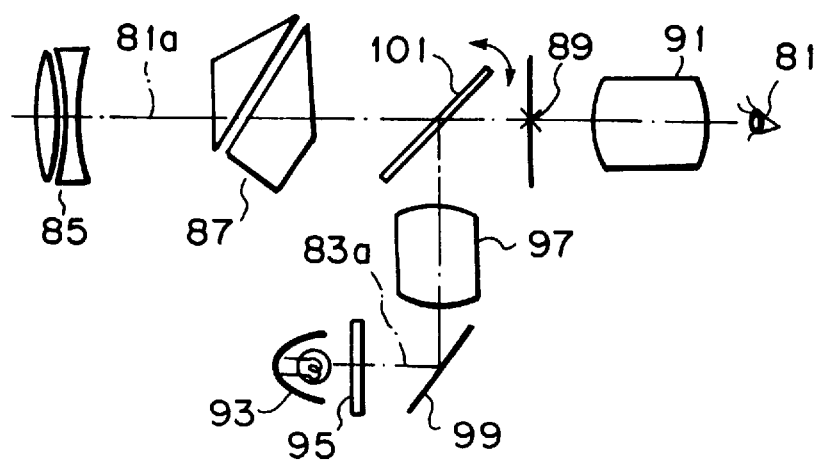
FIG. 6 is a schematic view showing a modified example of the optical system shown in FIG. 5.

Here, as shown in FIG. 6, the optical system for the left eye within the housing 10 may be configured such that any of the image of the observed landscape 51 and the map image 53 is made incident on a left eye 81 as a movable mirror 101 is switched over. Namely, when the movable mirror 101 is disposed at the position shown in FIG. 6, the map image 53 on an LCD 95 illuminated with a back light 93 is reflected by a mirror 99 and the movable mirror 101 so as to form an image at an imaging position 89 by means of a lens 97 and then is enlarged by an ocular 91 so as to be made incident on the left eye 81 of the observer. On the other hand, when the movable mirror 101 is rotated in the direction of arrow and moved out of an optical axis 81a, the image of the observed landscape 51 formed at the imaging position 89 by an objective lens 85 and an erect prism 87 is enlarged by the ocular 91 and made incident on the left eye 81.

Accordingly, when the optical systems are configured within the housing 10 as shown in FIG. 6, the external landscape can be observed three-dimensionally with both right and left eyes, and the image of the observed landscape 51 can be observed with the right eye while the map image 53 corresponding to the landscape 51 can be seen with the left eye.

The movable mirror 101 may be switched over as the operation section 37 such as that shown in FIG. 1 is manipulated.

Figure 7:
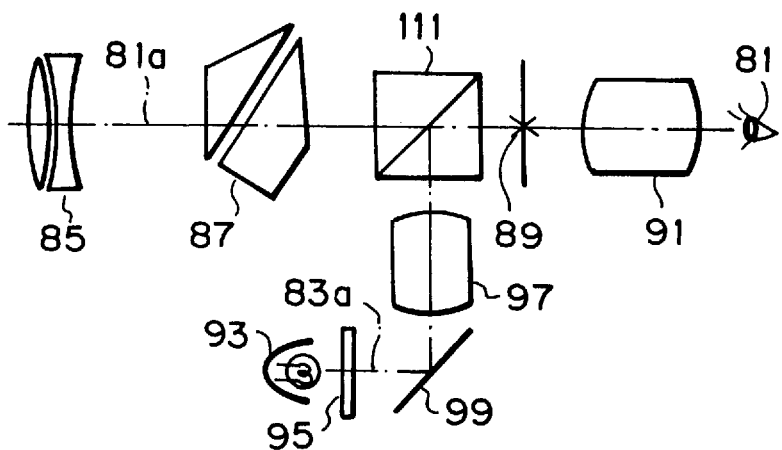
FIG. 7 is a schematic view showing another modified example of the optical system shown in FIG. 5.

Alternatively, as shown in FIG. 7, when a half prism 111 is disposed in place of the above-mentioned movable mirror 101, the map image 53 can be seen with the left eye 81 as being overlapped with the image of the observed landscape 51.

Without being restricted to the embodiments mentioned above, the observing apparatus of the present invention can be modified in various manners. For example, though the map image is displayed within the left-eye visual field in the foregoing embodiments, it may be displayed within the right-eye visual field, of course. Also, the map image and the information concerning the position coordinate of the object to be observed may be displayed on a display section disposed at the outer wall portion of the housing of the observing apparatus. Also, while the foregoing embodiments are configured as binocular type, when the optical systems within the housing 10 are configured as shown in FIG. 6 or 7, a monocular type unit can be constructed.

Figure 8:
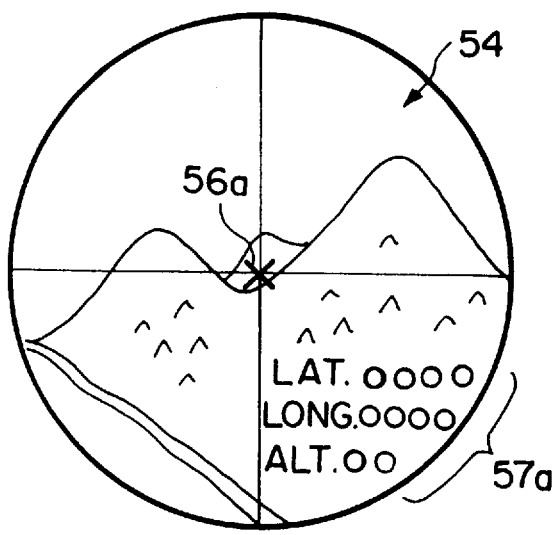
FIG. 8 is a landscape and a position coordinate of a target for observation which are observed within the visual field of the glass unit different from that shown in FIG. 1.

In this case, as shown in FIG. 8, values 57a indicative of the longitude, latitude, and altitude of the target position for observation can be displayed as being overlapped with an observed landscape 54 within the visual field.

Figure 9:
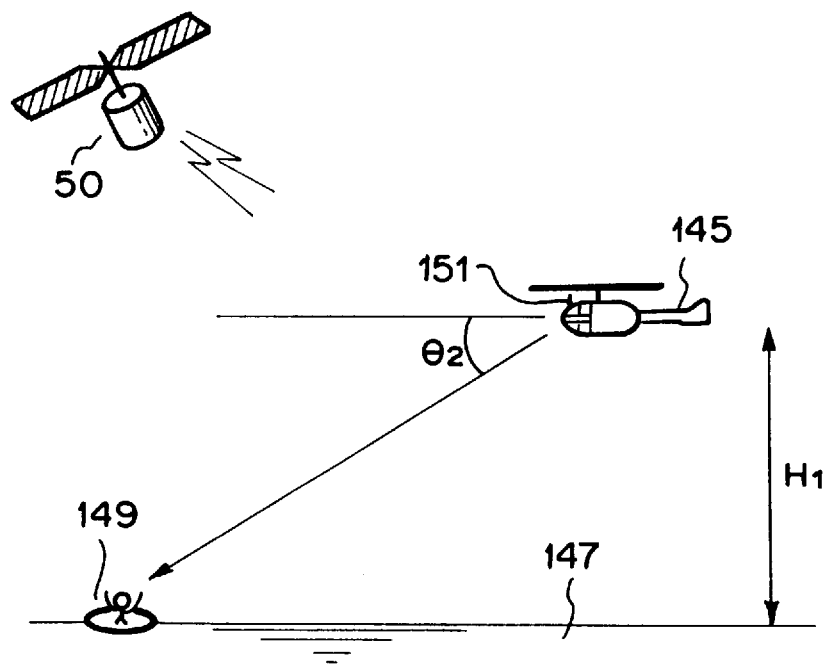
FIG. 9 is a view for explaining the method of use different from that shown in FIG. 2.

Also, as shown in FIG. 9, when the position of a sufferer 149 on the sea 147 is to be determined from a helicopter 145 or the like, a procedure similar to that used for determining the position of the mountaineering sufferer 49 is used. In this case, however, the altitude for the sufferer 149 on the sea can be made zero. As the own position of the helicopter 145 or the like is detected, an altitude difference H1 of the own position from the target position for observation is specified. Accordingly, based on the depression and elevation angle data (corresponding to θ 2 in FIG. 9), the distance from the own position to the sufferer can be determined more easily. Further, when the azimuth data is added thereto, the position of the sufferer can be easily determined.

Here, when the GPS electric waves are to be received in the helicopter 145, though they can be received by an internal antenna, an external antenna 151 may be provided for receiving them according to circumstances, of course.

In the binocular of this embodiment, a map data of a coast area may be used as the map information stored therein. In this case, when a target of the coast area is confirmed from above the sea, this target position can be instantly identified on the displayed map information.

Also, when the own position and the target position for observation are located on substantially the same level of altitude, neither the depression and elevation angle sensor nor information concerning the altitude of the own position is necessary, whereby the operational processing for determining the target position for observation becomes easy.

Further, the distance measuring means should not be restricted to those of the foregoing embodiments. Other means employing various kinds of known distance-measuring techniques, such as a technique using parallax, can be adopted.

kinds of map information can be adopted as the map information to be stored within the map database memory (CD-ROM, ID card, or the like). For example, 1:50,000 sectional topographic maps issued by Geographic Survey Institute of Japan may be used. Desirably, names of places have been written within the topographic map beforehand.

Also, means for displaying the map information may be attached to the outside of the housing for the glass unit, for example, onto the upper wall surface of the glass unit. In this case, a larger picture can be formed. Also, in this case, when the display means is formed collapsible, its portability becomes favorable.

Further, in place of the GPS unit, other self-position detecting means such as gyroscope may be used. The map image within the visual field of the glass unit may be displayed such that the north direction is always placed upward. Alternatively, the map image may be displayed as being rotated according to the direction of the glass unit such that the observed direction is placed upward.

Also, the observer's own position specified in the map image may be set such that it is located at an end portion of the visual field of the glass unit as shown in FIG. 4 or at the center portion thereof.

Here, the observation target should not be restricted to humans such as sufferer, of course. The position of animals or various landscapes can be similarly determined.

Also, the observing apparatus of the present invention can be applied to other apparatuses such as camera. When applied to a camera, the coordinate position of the observation target can be taken into a photographic film or recorded in a recording medium.

Here, though the image signal and LCD in the foregoing embodiments are assumed to handle color images, their configuration become simpler when they handle monochromatic images alone.

As explained in the foregoing, in accordance with the observing apparatus of the present invention, the own position, the azimuth of the observation target direction, and the distance from the own position to the target position for observation are the position coordinate of the target position for observation is computed on the basis of thus detected information; and thus computed coordinate and detected information are displayed on the display means. Accordingly, the current position of the observation target can be determined correctly and rapidly.

Therefore, a fast and accurate decision can be made when a sufferer is to be rescued, for example.

Also, digital map information is read out from the memory such that a map image is displayed by the display means, whereby, while an object is observed, a position corresponding to this object can be specified in the map image displayed by the display means. Accordingly, the observer can grasp the position of the object to be observed more clearly and specifically.

Also, when the map image is displayed within the visual field of the glass unit, the observer's own position can be specified without the eyes being separated from the ocular portion of the glass unit.

What is claimed is:

1. An observing apparatus which can display an image of an object to be observed in a desired direction, said apparatus comprising:

a self-position detecting means for detecting a position coordinate thereof;

an azimuth detecting means for detecting a direction of observation by a user;

a distance measuring means for measuring a distance thereof from said object to be observed;

a position coordinate computing means which computes a position coordinate of said object to be observed, based on outputs of said self-position detecting means, azimuth detecting means, and distance measuring means;

a memory which stores digital map information, a map information readout means for reading out the map information within said memory; and a display means which displays the map information read out by said map information readout means, while displaying a predetermined mark at a position corresponding to the computed position coordinate in the displayed map information.

2. An observing apparatus according to claim 1, wherein said map information and predetermined mark is'displayed within a visual field for observing said image of the object to be observed.

3. An observing apparatus according to claim 1, wherein said distance measuring means comprises a means for detecting an altitude thereof and a means for detecting angle of depression and elevation in said direction of observation.

4. An observing apparatus according to claim 1, wherein said observing apparatus comprises a binocular and wherein said display means displays said map information within one of visual fields of said binocular.

5. An observing apparatus according to claim 1, wherein said observing apparatus comprises a monocular or binocular and wherein said display means selectively displays, within at least one visual field, said image of the object to be observed and said map information.

6. An observing apparatus according to claim 1, wherein said observing apparatus comprises a monocular or binocular and wherein said display means displays, within at least one visual field, said image of the object to be observed and said map information in an overlapping manner.

7. An observing apparatus according to claim 1 wherein said observing apparatus comprises a camera.

* * * * *